United States Patent Office 2,957,647
Patented Oct. 25, 1960

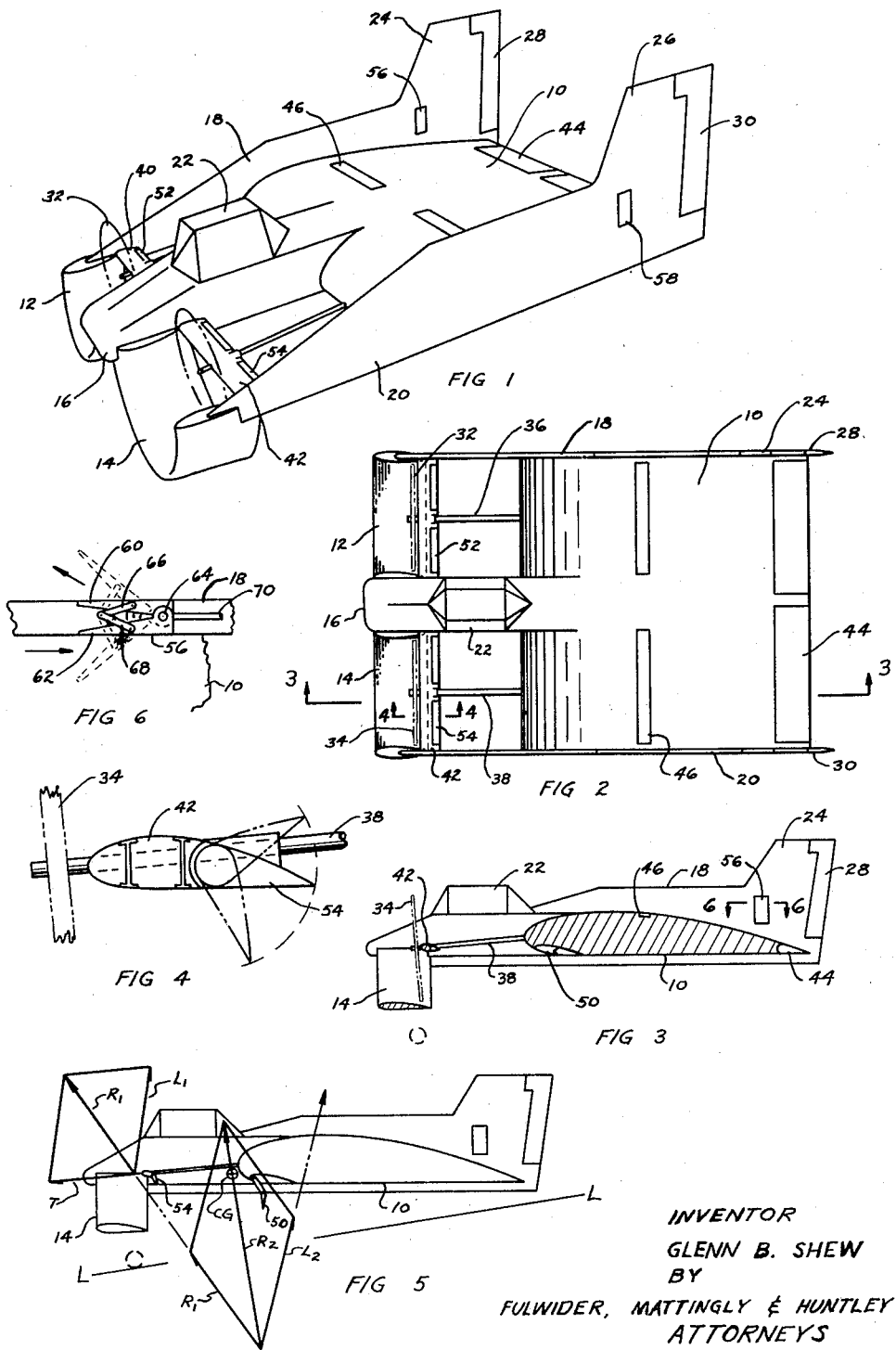

2,957,647

HIGH-LIFT AIRCRAFT

Glenn B. Shew, 3358 Lewis Ave., Long Beach, Calif.

Filed Feb. 24, 1958, Ser. No. 716,993

13 Claims. (Cl. 244—12)

The present invention relates generally to the field of aircraft and more particularly to a high-lift aircraft of unique design.

The aircraft embodying the present invention utilizes a conventional main wing in conjunction with a channel-type wing structure disposed forwardly thereof. This arrangement makes possible a rugged yet light-weight construction whereby the aircraft is usable on small and unprepared fields. This design also permits the use of a low aspect ratio main wing such as one or slightly under. Hence, the lift of such main wing is greater than would be the case where a higher aspect ratio, such as the conventionally used six or eight to one is employed. All of the lifting and control surfaces of this aircraft may be swept by the flow of air passing through the propeller means. Thus, good handling characteristics at low speeds may be obtained. This construction also permits a low wing loading whereby landing and take-off speeds may be extremely low actually ranging down to zero depending on the prevailing conditions. The aircraft is so designed, however, as to be capable of conventional long roll take-off and landings for heavy loads.

It is a major object of the present invention to provide an aircraft utilizing a conventional straight main wing in conjunction with a channel-type wing structure disposed forwardly thereof.

Another object is to provide an aircraft having considerable control response at low speeds.

Yet a further object of the invention is to provide an aircraft having a maximum lifting ability for a given amount of power.

A further object is to provide an aircraft which will be extremely rugged and is capable of operation from small and unprepared fields whereby it will prove especially valuable for military, agricultural, and firefighting uses.

An important object of the invention is to provide an aircraft having a fixed main wing, a channel-type wing structure disposed forwardly thereof, propeller means arranged within the channel-wing structure and flap means selectively usable to direct the flow of air from the propeller means downwardly so as to provide particularly short take-off and landing characteristics.

These and other objects and advantages of the present invention will become more apparent from the following detailed description when taken in conjunction with the appended drawings wherein:

Figure 1 is a perspective view of a preferred form of aircraft constructed in accordance with the present invention;

Figure 2 is a top plan view of said aircraft;

Figure 3 is a vertical sectional view taken on line 3—3 of Figure 2;

Figure 4 is an enlarged vertical sectional view taken on line 4—4 of Figure 2; and Figure 5 is a diagrammatic view showing the forces acting upon said aircraft during take-off; and Figure 6 is an enlarged horizontal sectional view taken on line 6—6 of Figure 3.

Referring to the drawings, a preferred form of aircraft embodying the present invention broadly comprises a straight main wing 10, a pair of channel wing members 12 and 14, with each of these members forming a forwardly, upwardly and rearwardly opening channel, and structural means supporting the channel members 12 and 14 in side-by-side relationship and spaced forwardly of the leading edge of the main wing 10. The structural means includes a fuselage 16 which extends forwardly from the central forward portion of the wing 10 and a pair of boom members 18 and 20 which are secured along the major portion of their length to the tips of the main wing 10. These booms 18 and 20 extend forwardly of the main wing 10 parallel with the fuselage 16.

More particularly, the main wing 10 may be of conventional construction and preferably has a low aspect ratio in the nature of one or less. The fuselage 16 includes a pilot's compartment 22 housing the conventional air craft controls and the like. The channel wing members 12 and 14 are substantially identical and are provided with a conventional airfoil cross-section, as will be clear from Figure 3. The booms 18 and 20 are of upstanding plate-like configuration and are rigidly connected at their forward ends to the upper outer tips of the channel wing members 12 and 14. The rear portion of these booms are contiguous with a pair of vertical stabilizers 24 and 26, respectively. Conventional rudders 28 and 30 are provided for the vertical stablizers.

A pair of propellers 32 and 34 are provided for the channel members 12 and 14, respectively. These propellers 32 and 34 are rotated by shafts 36 and 38 which extend forwardly from the leading portion of the wing 10 and are in turn rotated by a suitable power plant housed within this wing. The front portion of these shafts 36 and 38 are journaled within the mid-portion of a pair of horizontally extending struts 40 and 42, respectively, the inner end of each of these struts being affixed to the fuselage 16 and the outer ends thereof being affixed to the forward portion of the booms 18 and 20. The struts 40 and 42 are of airfoil cross-section.

The rear portion of the main wing 10 is provided with conventional elevators 44 while the intermediate upper portion thereof is provided with conventional spoilers 46. As shown in Figure 3, the underside of the leading edge of the main wing 10 is formed with a conventional downwardly folding, double curvature flap or vane 50. The struts 40 and 42 also are each formed with a pair of downwardly and upwardly tiltable flaps designated 52 and 54, respectively, at their rear portions. The vane 50 and flaps 52 and 54 may be operated differentially with or without the elevators 44 and/or the spoilers 46 so as to provide a rolling moment to the aircraft similar to that provided by the ailerons of a conventional fixed wing aircraft.

As indicated in Figure 3, the propellers 32 and 34 will preferably be mounted at a negative angle relative to the longitudinal axis of the aircraft so as to provide negative thrust. The magnitude of such downward angle is exaggerated in this figure as well as in Figure 4 in the interest of clarity. The utilization of such negative thrust will have the effect of creating an angle of incidence for the main wing 10, and will additionally increase the lift produced by the channel wing members 12 and 14. With continued reference to Figure 3, the propellers 32 and 34 will preferably be disposed within the confines of the channel members 12 and 14 at the rear portion thereof. This will result in the production of maximum lift. Additionally, ground personnel are protected against inadvertent contact with the propellers by this arrangement.

Referring now particularly to Figures 3 and 6, the front portion of each vertical stabilizer 24 and 26 may be provided with air brakes 56 and 58, respectively. These air brakes 56 and 58 are substantially identical in construction and each include a pair of plate elements 60 and 62 which as indicated in Figure 6 are pivoted at their rear portions to a vertical hinge element 64. Forwardly of the hinge 64, the intermediate portions of the plates are pivotally affixed to the rear end of one of a pair of links 66 and 68, with the front end of such links being pivotally interconnected. A suitably actuated push rod 70 exerts longitudinal force upon the hinge 64 so as to move the plates 60 and 62 between their normal solid outline position of Figure 6 to their dotted outline open position of this figure. When arranged in such open position rearwardly directed air will flow through the openings formed in the vertical stabilizer when the plates 60 and 62 are opened in the path indicated by the directional arrows in Figure 6, i.e. the direction of flow of such air is directed outwardly of the vertical stabilizers and reversed in direction so as to produce a rearwardly-acting force on the aircraft.

In the operation of the aforedescribed aircraft, when taking off the forward wing vane 50 as well as the flaps 52 and 54 of the struts 40 and 42 are preferably lowered to their position of Figure 5. This arrangement serves to deflect the propeller blast downwardly and provides maximum lift for taking off. The lift produced by the aircraft at this time is shown diagrammatically in Figure 5.

With further reference to Figure 5, front and rear vector diagrams of the forces acting upon the aforedescribed aircraft during take-off are superimposed over a side elevation of the aircraft. In the forward diagram the vector T represents the forward thrust produced by the propellers 32 and 34. The vector $L_1$ represents the sum of the lift provided by the channel wing members 12 and 14 and the struts 40 and 42 with flaps 52 and 54 in lowered position. The resultant of these two forces is the forwardly and upwardly extending vector $R_1$. This vector $R_1$ is shown transposed downward and rearwardly to the rear diagram, where it intersects the lower end of the vector $L_2$. $L_2$ represents the sum of the lift provided by the main wing 10 with its vane 50 in a lowered position. The sum of the vectors $L_1$ and $L_2$ is the vector $R_2$. As will be apparent, the vector $R_2$ extends forwardly and upwardly through the center of gravity of the aircraft and substantially normal to the ground level line L—L. Accordingly, where this vector $R_2$ has a magnitude greater than the weight of the aircraft, the latter will take off. Under the proper conditions the take-off run will be zero. In any event such take-off run may be kept to a minimum. When the aircraft is landed, the vane 50, and flaps 52 and 54 will be lowered and, as a result, the landing run will also be very short.

As a result of the aforedescribed force arrangements, it will be possible for the aircraft to remain in flight at very low ground speeds and under certain conditions it may actually hover. At this time, the booms 18 and 20 and the fins 24 and 26 will serve as end plates so as to restrain circulation of air from the propellers around the tips of the channel members and the wing 10. These booms 18 and 20 will likewise direct the air flow from the propellers 32 and 34 over the main wing 10 so as to prevent such air flow from being dissipated into the slower moving air exteriorly of these booms. It should be noted that although conventional flaps 52 and 54 are disclosed in the drawings, it is possible to employ other flap arrangements, such as the cascade-type flaps. Slats, slots, blowers and other flow control devices may prove useful. The air brakes 56 and 58 may be opened when the aircraft must take off or land in a confined space where it is necessary to maintain the aircraft in a ground level landing position without appreciable forward movement. These brakes when opened also make the aircraft less vulnerable to gusts while maneuvering close to the ground since they permit it to hover in a nearly horizontal position.

Various other modifications and changes may be made without departing from the spirit of the invention or the scope of the following claims.

I claim:

1. An aircraft comprising: a wing; a pair of channel members, each forming a forwardly, upwardly and rearwardly opening channel; structural means supporting said channel members spaced forwardly of said wing in side-by-side relationship; horizontal strut means of airfoil cross-section extending transversely across the upper portion of each of said channel members; flap means carried by said strut means; and downwardly folding vane means carried by the leading edge portion of said wing.

2. An aircraft comprising: a wing; a pair of channel members, each forming a forwardly, upwardly and rearwardly opening channel; structural means supporting said channel members spaced forwardly of said wing in side-by-side relationship; horizontal strut means of airfoil cross-section extending transversely across the upper portion of each of said channel members; flap means carried by said strut means; downwardly folding vane means carried by the leading edge portion of said wing; and propeller means disposed in each of said channel means forwardly of said strut means.

3. An aircraft as set forth in claim 2 wherein the shaft means for said propeller means are supported by said strut means.

4. An aircraft comprising: a straight wing; a pair of channel members, each forming a forwardly, upwardly and rearwardly opening channel; a fuselage extending forwardly from the central portion of said wing and secured to the inner portion of each of aid channel members; a pair of boom members secured to the outer portions of said wings and extending forwardly with their front portions secured to the outer portion of said channel members; horizontal strut means of airfoil cross-section extending transversely across the upper portion of each of said channel members; flap means carried by said strut means; and downwardly folding vane means carried by the leading edge portion of said wing.

5. An aircraft comprising: a straight wing; a pair of channel members, each forming a forwardly, upwardly and rearwardly opening channel; a fuselage extending forwardly from the central portion of said wing and secured to the inner portion of each of said channel members; a pair of boom members secured to the outer portions of said wings and extending forwardly with their front portions secured to the outer portion of said channel members; horizontal strut means of airfoil cross-section extending transversely across the upper portion of each of said channel members; flap means carried by said strut means; downwardly folding vane means carried by the leading edge portion of said wing; and propeller means disposed in each of said channel means forwardly of said strut means.

6. An aircraft as set forth in claim 5 wherein the shaft means for said propeller means are supported by said strut means.

7. An aircraft comprising: a straight wing; a pair of channel members, each forming a forwardly, upwardly and rearwardly opening channel, said channel members being spaced forwardly of said wing and having their major portion disposed below said wing; structural means securing said channel members to said wing and including a pair of booms of upstanding plate-like configuration that extend forwardly along the outer edges of said wing and are connected at their front portions to the outer portion of said channel members; vertical stabilizer and rudder means formed at the rear portion of each of said booms; downwardly folding air deflecting means associated with said channel members of said wing; propeller means disposed in each of said channel members; and power plant means operatively connected to said propeller means.

8. An aircraft comprising: a straight wing; a pair of channel members, each forming a forwardly, upwardly and rearwardly opening channel, said members being spaced forwardly of said wing and having their major portion disposed below said wing; structural means securing said channel members to said wing and including a pair of booms of upstanding plate-like configuration that extend forwardly along the outer edges of said wing and are connected at their front portions to the outer portion of said channel members; vertical stabilizer and rudder means formed at the rear portion of each of said booms; horizontal strut means of airfoil cross-section extending transversely across the upper portion of each of said channel members; flap means carried by said strut means; downwardly folding vane means carried by the leading edge portion of said wing; propeller means disposed in each of said channel members; and power plant means operatively connected to said propeller means.

9. An aircraft comprising: a straight wing; a pair of channel members, each forming a forwardly, upwardly and rearwardly opening channel, said channel members being spaced forwardly of said wing and having their major portion disposed below said wing; structural means securing said channel members to said wing and including a pair of booms of upstanding plate-like configuration that extend forwardly along the outer edges of said wing and are connected at their front portions to the outer portion of said channel members; vertical stabilizer and rudder means formed at the rear portion of each of said booms; a fuselage extending forwardly from the central portion of said wing and secured to the inner portion of each of said channel members; horizontal strut means of airfoil cross-section extending transversely across the upper portion of each of said channel members; flap means carried by said strut means; downwardly folding vane means carried by the leading edge portion of said wing; and propeller means disposed in each of said channel means forwardly of said strut means.

10. An aircraft as set forth in claim 9 wherein the shaft means for said propeller means are supported by said strut means.

11. An aircraft comprising: a straight wing; a pair of channel members, each forming a forwardly, upwardly and rearwardly opening channel; a fuselage extending forwardly from the central portion of said wing and secured to the inner portion of each of said channel members; a pair of boom members secured to the outer portions of said wings and extending forwardly with their front portions secured to the outer portion of said channel members; horizontal strut means of airfoil cross-section extending transversely between said fuselage and said boom members adjacent the rear portion of said channel members; flap means carried by said strut means; and downwardly folding vane means carried by the leading edge portion of said wing.

12. An aircraft comprising: a wing; a pair of channel members, each forming a forwardly, upwardly and rearwardly opening channel; structural means supporting said channel members spaced forwardly of said wing in side-by-side relationship; horizontal strut means of airfoil cross-section extending transversely across the upper portion of each of said channel members; flap means carried by said strut means; downwardly folding vane means carried by the leading edge portion of said wing; and air brakes carried by said structural means.

13. An aircraft comprising: a straight wing; a pair of channel members, each forming a forwardly, upwardly and rearwardly opening channel; a fuselage extending forwardly from the central portion of said wing and secured to the inner portion of each of said channel members; a pair of boom members secured to the outer portions of said wings and extending forwardly with their front portions secured to the outer portion of said channel members; horizontal strut means of airfoil cross-section extending transversely across the upper portion of each of said channel members; flap means carried by said strut means; downwardly folding vane means carried by the leading edge portion of said wing; and air brakes carried by said boom members.

References Cited in the file of this patent

UNITED STATES PATENTS

| 2,476,482 | Custer | July 19, 1949 |
| 2,665,083 | Custer | Jan. 5, 1954 |

FOREIGN PATENTS

| 359,087 | Great Britain | Oct. 22, 1931 |